United States Patent [19]

Skoures

[11] 3,769,844
[45] Nov. 6, 1973

[54] SOLID STATE ACCELERATION COUNTER

[75] Inventor: Alexander E. Skoures, Philadelphia, Pa.

[73] Assignee: The United States of America as represented by the Secretary of the Navy, Washington, D.C.

[22] Filed: Apr. 29, 1971

[21] Appl. No.: 138,516

[52] U.S. Cl....... 73/517 R, 235/92 AE, 235/92 CA, 235/92 PB, 235/92 R
[51] Int. Cl. ........................................... G01p 15/08
[58] Field of Search .................. 235/92 AE, 92 CA, 235/92 PB; 73/88.5 R, 91, 517 R, 489

[56] References Cited
UNITED STATES PATENTS

| 3,628,377 | 12/1971 | Weiss ..................................... 73/91 |
| 3,517,550 | 6/1970 | Leventhal ....................... 73/88.5 R |
| 2,867,382 | 1/1959 | Weaver ......................... 235/92 AE |
| 3,295,364 | 1/1967 | Van Dyke ....................... 73/88.5 R |
| 2,590,057 | 3/1952 | Wiegand ......................... 235/92 PB |
| 3,643,513 | 2/1972 | Weaver .......................... 73/517 R |

Primary Examiner—Maynard R. Wilbur
Assistant Examiner—Joseph M. Thesz, Jr.
Attorney—R. S. Sciascia and Henry Hansen

[57] ABSTRACT

An accelerometer mounted to an aircraft structure supplies an electrical signal to a low-pass filter in which all frequencies above 2.5 Hz are attenuated. The signal from the filter is applied to a timing circuit wherein a switch is actuated if the applied signal exceeds a preset amplitude for a predetermined period of time. The output signal of the filter is also applied to a plurality of voltage comparators of various settings in which respective output signals are generated if the filter output signal exceeds various predetermined setpoints. The coincidence of outputs from the timing circuit and an individual voltage comparator pulses a counter associated with the comparator and advances the counter one unit to record the fact that a load factor level above a predetermined magnitude has been experienced by the aircraft.

8 Claims, 3 Drawing Figures

SOLID STATE ACCELERATION COUNTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to an improved system for determining fatigue in aircraft structure. More particularly, the system provides a means for using an accelerometer system to reliably record the number of times an aircraft has experienced load factor levels above predetermined magnitudes. This enables aircraft structure to be retired in terms of fatigue experienced by the structure rather than the number of years it has been in service.

In fighter airplanes the dominating effects with respect to fatigue of wings are maneuver loads. Statistical data on these loads as well as other loads are available by acceleration measurements. However, it was found in F–4 aircraft that the natural frequency of available accelerometers is very close to the body bending frequency of the aircraft. Therefore, when an accelerometer is mounted on the wing, the accelerometer responds to low level superimposed fuselage vibrations as well as the load factor level of the aircraft.

Prior art devices for obtaining acceleration measurements for indicating load factor levels have included accelerometer counting systems. These systems provide electromechanical switches connected to a transducer output wherein fluctuations in load levels during the maneuvers of an aircraft tend to record an excessive count if the accelerometer output is constantly shifting above and below a predetermined level. Furthermore, the prior systems having a filter to eliminate accelerometer vibrations have not been successful where large resonant transients are experienced in close proximity to the filter cutoff frequency. In addition previous systems do not provide the close tolerance requirements necessary in such a device.

SUMMARY OF THE INVENTION

Accordingly, it is a general purpose of the present invention to provide a system for accurately counting the number of load factor levels above predetermined setpoints that are experienced by an aircraft. It is a further object to provide a system that measures load factor levels within close tolerance and eliminates all spurious signals and changes in levels of signals during maneuvers that would tend to given an excessive count.

This is accomplished according to the present invention by mounting an accelerometer on an aircraft wing for sensing load factor levels applied to the structure of the aircraft and providing an analog electrical signal indicative thereof. All signals of a frequency above a predetermined level are then attenuated by a low-pass filter and the remaining signal is compared to a plurality of predetermined amplitude levels. If the filtered signal should exceed a predetermined level, a gating signal is supplied. If in addition the signal should exceed a predetermined period of time a driving signal is gated for recording that a load factor level has been exceeded. The system further rejects all fluctuations in the magnitude of the filtered signal above and below these predetermined load factor levels until the filtered signal is reduced below a predetermined lower level reset point.

DESCRIPTION OF THE PREFERRED EMBODIMENT

Figure 1:
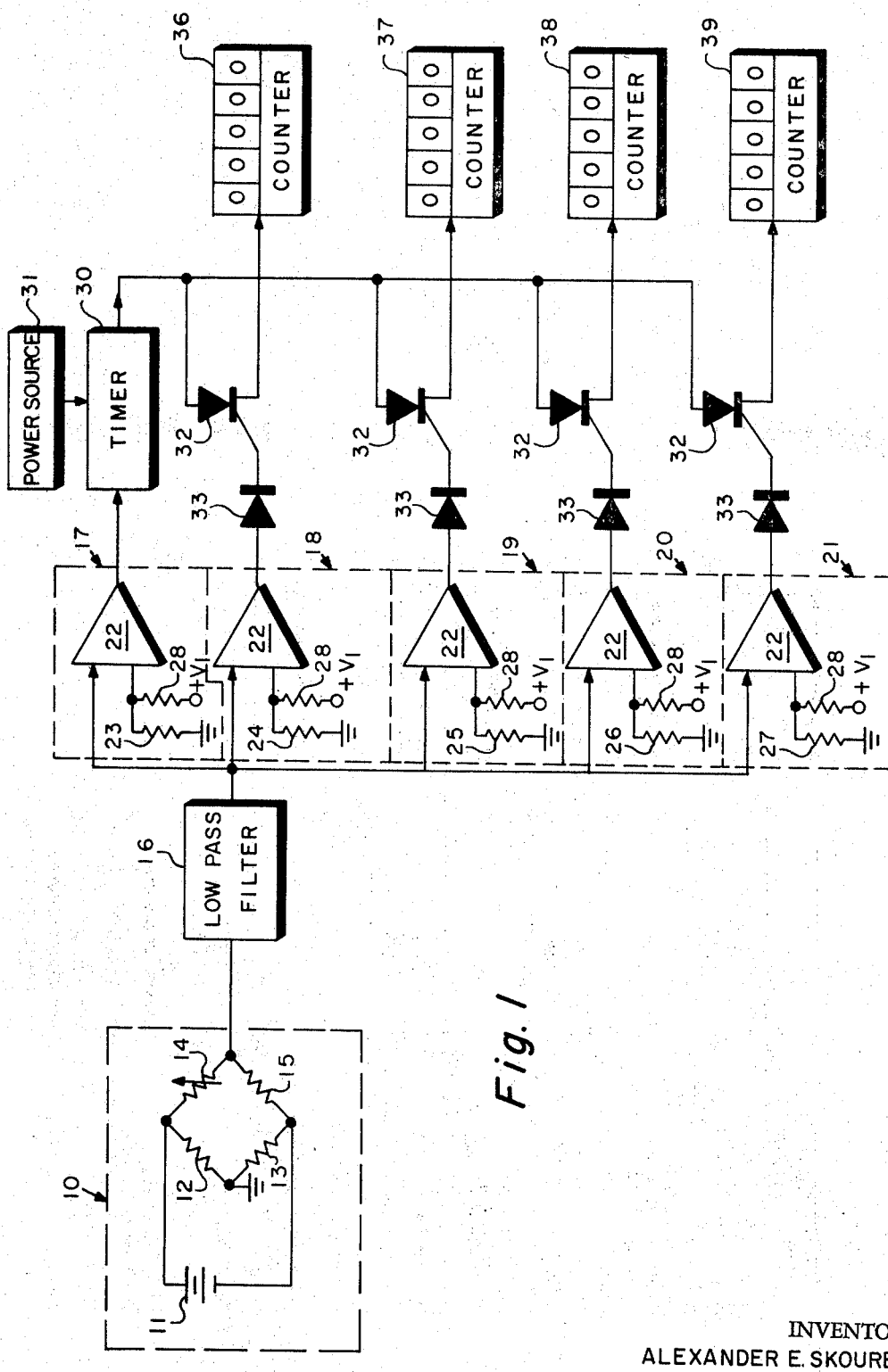
FIG. 1 is a schematic block diagram of a preferred embodiment according to the invention.

Referring now to the drawing and more particularly to FIG. 1 there is shown an accelerometer circuit 10 that is used for monitoring load factor levels applied to an aircraft. The circuit 10 comprises an accelerometer transducer 14 normally mounted on a wing of an aircraft in which the resistance varies as a function of sensed acceleration. Typically an accelerometer is a mass free to move in one direction against a restraining spring. The mass may have a wiper arm connected to a rheostat to function as a variable resistor. Other types of accelerometers such as those using differential transformers with its output demodulated may also be used.

The transducer 14 is connected as an arm in a Wheatstone bridge that has resistances 12, 13 and 15 connected as the additional arms. A battery 11 is connected to a pair of opposite terminals on the bridge.

On transducer 14 experiencing a load, its resistance changes unbalancing the bridge and generating an output signal across a second pair of opposite terminals. As shown, the terminal between transducer 14 and resistance 15 supplies the output signal and the opposite terminal between resistances 12 and 13 is grounded.

The output signal is sensed by a low-pass filter 16 that rejects all frequencies above 2.5 Hz and has an attenuation capability of −35 db at 4 Hz. The output of low-pass filter 16 is applied to five voltage comparator circuits 17, 18, 19, 20 and 21. Each of these circuits comprise a differential amplifier 22 receiving the signal from filter 16 at one input. A second input of amplifiers 22 is supplied from a bias voltage $V_1$ through voltage divider circuits comprising the respective resistors 23, 24, 25, 26 and 27, with each resistor in series with a fixed resistor 28. The resistances of resistors 23–27, inclusive, vary depending on the input voltage requirement of its respective voltage comparator. In this embodiment each successive resistor 23–27, inclusive, is of a lower resistance than the previous lower number resistor in order that the voltage applied from filter 16 to each successive amplifier 22 must increase in order to obtain an output signal. In the present embodiment a bias voltage $V_1$ of +5 volts is used. The input voltage to respective amplifier 22 from the contact of resistor 23 is 0.55 volts, from resistor 24, 0.80 volts, from resistor 25, 0.95 volts, from resistor 26, 1.25 volts, and from resistor 27, 1.60 volts.

The output of voltage comparator 17 is applied to a timer 30 that provides a time delay of 200 milliseconds before connecting a power source 31 to the output of the timer in a manner to be described later. The output of timer 30 is applied to the anodes of four silicon controlled rectifiers 32. The gate electrode of the SCR's 32 receive signals from voltage comparators 18, 19, 20 and 21, respectively, through respective diodes 33. Upon coincidence of signals at both the anode and gate electrodes of the SCR's 32, the signal at the anode is conducted through the cathode and pulses a respective counter 36, 37, 38 or 39.

Figure 2:
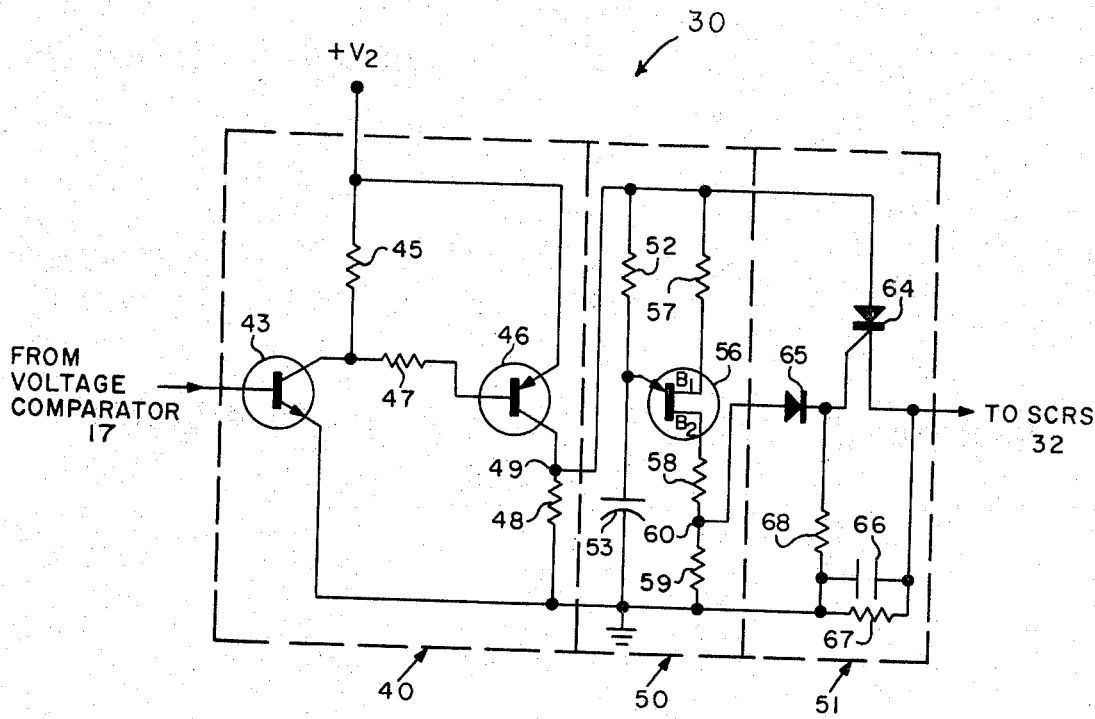
FIG. 2 is a schematic block diagram of the timer circuit of FIG. 1.

Referring now to FIG. 2 there is shown the timer 30 that includes a power switch 40 receiving a signal from voltage comparator 17 and a supply voltage $+V_2$ from source 31 of FIG. 1. The signal from voltage comparator 17 is applied to the base of transistor 43. The $V_2$ signal is supplied to the collector of transistor 43 through a resistor 45 and directly to the emitter of a transistor 46. The emitter of transistor 43 is grounded. The coincidence of signals from both $+V_2$ and voltage comparator 17 causes transistor 43 to conduct. The collector of transistor 43 is also connected to the base of transistor 46 through a resistor 47. The conduction of transistor 43 causes a voltage drop in resistor 45 which lowers the signal applied to the base of transistor 46 enabling transistor 46 to conduct. The collector of transistor 46 is connected to ground through a dropping resistor 48. The dropping resistor 48 provides a signal level at a terminal 49 connected at the collector electrode of transistor 46.

The signal from terminal 49 is supplied to a relaxation oscillator 50 that has a series circuit of resistor 42 and capacitor 53 that is connected to ground. A contact between resistor 52 and capacitor 53 is connected to the emitter electrode of a unijunction transistor 56. Base $B_1$ of transistor 56 is connected to a resistor 57 that has its other contact connected to terminal 49. Base $B_2$ of transistor 56 is connected to two resistors 58 and 59 connected in series to ground and having a terminal 60 intermediate thereof.

In operation the relaxation oscillator 50 initially has its capacitor 53 discharged, forcing the emitter of unijunction transistor 56 to ground potential. As a voltage output is received from switch 40 the capacitor 53 is charged through resistor 52. When the emitter voltage of transistor 56 is equal to its peak point voltage, the resistance between the emitter and $B_2$ junction of transistor 56 drops. The capacitor 53 is then discharged through the emitter, $B_2$ junction, and the charging process is repeated.

The output of relaxation oscillator 50 is supplied to the driver 51 from the terminal 60 to a gate electrode of a silicon controlled rectifier 64 through a diode 65. The anode of SCR 64 receives its signal from terminal 49 of switch 40. Upon coincidence of signals from the switch 40 and the relaxation oscillator 50 the SCR conducts and remains conducting until the signal to its anode is removed, providing an output signal to the four silicon controlled rectifiers 32. A decoupling capacitor 66 is connected from the cathode of SCR 64 to ground for passing high frequency signals. A resistor 67 is connected across capacitor 66 and functions as a driving impedance for the load. In addition, a bias resistor 68 is connected from the gate electrode of SCR 64 to ground.

Figure 3:
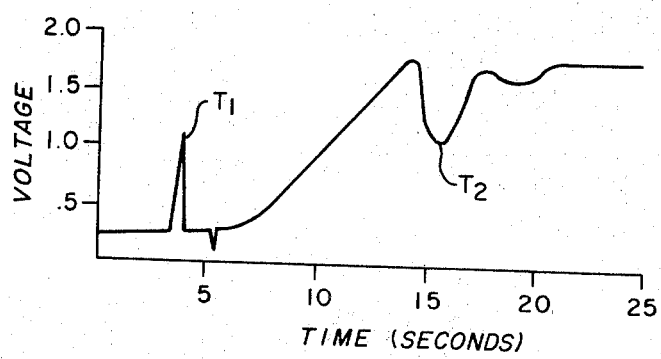
FIG. 3 represents a voltage-time diagram of a signal applied to the voltage comparators of FIG. 1.

FIG. 3 shows a representative signal applied to voltage comparators 17-21, inclusive, from filter 16. The fluctuation at $T_1$ may be caused by a spurious frequency signal slightly greater than 2.5 c.p.s. that filter 16 cannot sufficiently attenuate. The decrease in signal at $T_2$ may be caused by a change in an aircraft maneuver decreasing the loading in the area of the transducer 14.

The operation of the device will now be explained with reference to the figures. On sensing a load applied to the structure on which it is mounted transducer 14 changes its resistance enabling an output signal to be provided to low-pass filter 16. An output signal from low-pass filter 16 is supplied to voltage comparator 17 and if its magnitude exceeds a predetermined level an amplified output is applied to timer 30. Timer 30 comprising power switch 40, relaxation oscillator 50 and driver 51 on sensing a signal from comparator 17 for a predetermined period of time provides a signal to the anodes of the four SCR's 32. In addition to the signal applied to voltage comparator 17, the signal from low-pass filter 16 is also applied to voltage comparators 18, 19, 20 and 21 all set at predetermined differing voltage levels. If the signal applied to the comparators 18-21, inclusive, should exceed the predetermined set levels, the individual comparator supplies an output signal to the gate of its respective SCR 32. Upon coincidence of signals from timer 30 and respective comparators 18-21, inclusive, the SCR's 32 conduct and advance their associated counters 36-39, inclusive, one count. SCR's 32 continue to conduct until such time as the signal applied to reset voltage comparator 17 drops below a predetermined level. In this way changes in load level such as at time $T_2$ where all signals are above the reset level in no way affect the count given. Nor do rapid fluctuations such as those encountered at $T_1$ have any effect as they do not persist long enough to actuate timer 30.

It has therefore been shown a device for providing accurate counts as to the number of cycles a structure receives a load factor level above a predetermined set point. Problems associated with erroneous counts caused by decreases in load level during maneuvering have been eliminated as have spurious resonant signals. In this manner the excessive number of counts previously encountered in other systems has been eliminated. It is to be understood that an aircraft may have a plurality of such devices mounted in critical areas of the structure as each area is subject to differing load factor levels.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An acceleration counter comprising:
    transducer means for providing an electrical signal indicative of a magnitude of a load;
    a low-pass filter connected to said transducer means for conducting an electrical signal below a predetermined frequency;
    first comparator means connected to receive the low-pass filter signal for providing an output signal when the filter signal exceeds a predetermined level;
    timing means connected to said first comparator means for providing an output signal when the duration of the first comparator means output signal exceeds a predetermined period of time;
    second comparator means connected to receive the low-pass filter signal for providing at least one output signal when the filter signal exceeds at least one of a plurality of predetermined levels;
    first gating means including a plurality of silicon controlled rectifiers having anode electrodes parallelly connected to receive the timing means output signal and gate electrodes connected to receive respective ones of said second comparator means output signals for first conducting the timing means output signal upon coincidence of the timing means output signal and respective ones of said second comparator means output signals and for continuing to conduct the timing means output signal in the absence of the second comparator means output signals; and counting means connected to receive the timing means output signal from said first gating means for advancing one count on receipt of the timing means output signal.

2. An acceleration counter according to claim 1 wherein said timing means further comprises:

switching means adapted to receive a bias signal and connected to said first comparator means for providing an output signal upon receipt of a first comparator means output signal;

oscillation means connected to said switching means for providing an output signal upon receipt of said switching means output signal for a predetermined period of time; and second gating means connected to said switching means and said oscillation means for conducting the switching means output signal upon receipt of the oscillation means output signal and continuing to conduct until removal of the switching means output signal.

3. An acceleration counter according to claim 2 wherein said second gating means further comprises:

a silicon controlled rectifier having an anode connected to receive the switching means output signal, a gate connected to receive the oscillation means output signal and a cathode for providing an output signal upon coincidence of said oscillation means output signal and the switching means output signal and then continuing to provide an output signal so long as said switching means output signal persists.

4. An acceleration counter according to claim 3 wherein said oscillation means further comprises a relaxation oscillator circuit.

5. An acceleration counter according to claim 4 wherein said switching means further comprises:

a first transistor having a base electrode connected to said first comparator means, a collector electrode adapted to receive the bias signal and an emitter electrode grounded for conducting the bias signal upon receipt of an output signal from said first comparator means;

a second transistor having a base electrode connected to said first transistor's collector electrode, an emitter electrode connected to receive said bias voltage and a collector electrode having an output terminal connected for providing conduction for said bias signal upon said first transistor conducting; and a grounded resistor connected to said second transistor's collector electrode.

6. An acceleration counter according to claim 5 wherein said first transistor is an NPN junction transistor and said second transistor is a PNP junction transistor.

7. An acceleration counter according to claim 6 wherein said first comparator means further comprises:

a differential amplifier with a first input connected to receive the low-pass filter signal and a second input adapted to receive a reference level signal and providing an output when the low-pass filter signal exceeds the reference signal level.

8. An acceleration counter according to claim 7 wherein said second comparator means further comprises:

a plurality of voltage divider circuits adapted to receive an input signal and for providing output signals of various predetermined levels; and a plurality of differential amplifiers with a first input connected to receive the low-pass filter signal and a second input connected to receive respective voltage divider output signals so that each respective differential amplifier provides an output signal when the low-pass filter signal is in excess of its respective voltage divider output signal.

* * * * *